Feb. 13, 1923.

E. W. DAY ET AL 1,445,131

SELF LUMINOUS COMPASS

Filed Oct. 25, 1917

INVENTOR
EDWIN W. DAY AND
ROBERT S. A. DOUGHERTY.
BY
Herbert H. Thompson,
ATTORNEY Patented Feb. 13, 1923.

1,445,131

UNITED STATES PATENT OFFICE.

EDWIN W. DAY, OF BROOKLYN, NEW YORK, AND ROBERT S. A. DOUGHERTY, OF WASHINGTON, DISTRICT OF COLUMBIA; SAID DOUGHERTY ASSIGNOR TO JANE G. BREWSTER, OF LEAVENWORTH. KANSAS.

SELF-LUMINOUS COMPASS.

Application filed October 25, 1917. Serial No. 198,405.

*To all whom it may concern:*

Be it known that we, EDWIN W. DAY, and ROBERT S. A. DOUGHERTY, citizens of the United States of America, residing at 273 89th Street, Brooklyn, in the county of Kings and State of New York, and 1833 Irving St., Washington, in the District of Columbia, respectively, have invented certain new and useful Improvements in Self-Luminous Compasses, of which the following is a specification.

This invention relates to visual indicating devices or, in other words, to indicators of the kind which must be seen to be read.

The main object of the invention is to construct such indicators so that they may be read with facility not only in the daylight or when illuminated by artificial means but also in the dark. For this purpose we prefer to make use of a radio-active substance or substances so situated as to illuminate that part of the indicator which it is most essential to see.

Our invention is especially adapted for compasses such as used by aviators and soldiers. We are aware that it has been proposed to use radium paint in marking compass dials, whereby the dials themselves are rendered self-luminous, but it has been found objectionable for several reasons. When the luminous material is applied directly to the markings or hands of instruments in the form of a paint or paste, the small particles of radio sensitive substance upon which the radium rays must act to produce light become affected by the air, and gradually lose their value. One of the advantages of placing the material in an air tight tube is therefore obvious. Furthermore, the liquid, such as alcohol, with which it is found desirable to fill compasses, very often seriously damages the radium paint and causes rapid deterioration thereof. In addition, the difficulties in manufacture are greatly reduced since the necessity for carefully applying the paint is eliminated. Also subsequent reclaiming of the material is greatly facilitated where it is concentrated in the dry state in a small tube, whereas to reclaim this material after it has been applied as a paint is practically impossible.

Referring to the drawings.

Figure 1:
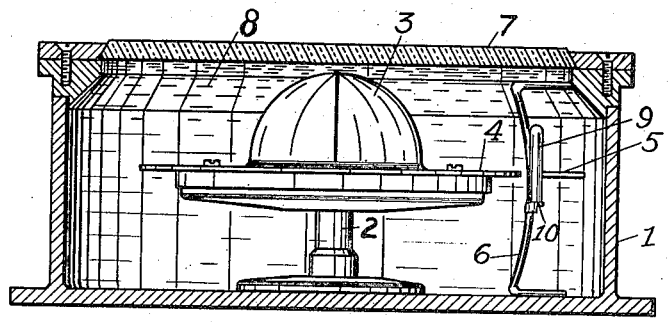
Fig. 1 is a vertical section of a compass.
Figure 2:
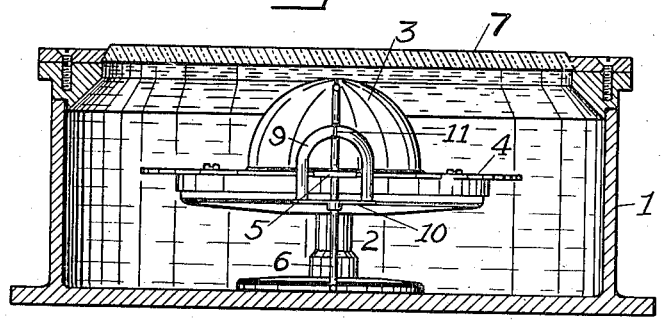
Fig. 2 is a vertical section of a compass taken at right angles to Fig. 1.

In Figs. 1 and 2 the compass casing is indicated at 1. From the bottom thereof rises the post 2 on the top of which is rotatably supported in the usual manner, the compass rose 3, containing the magnetic elements, not shown, and supporting the compass card. The reference index 5 is shown as supported on a wire 6.

The casing is shown as provided with a glass top 7 and is designed to be completely filled with a limpid, clear liquid 8 such as alcohol or preferably a mixture of alcohol and water.

Figure 3:
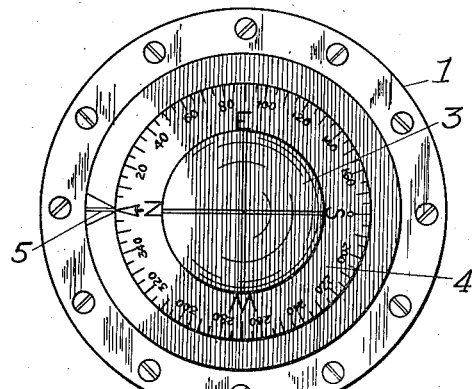
Fig. 3 is a top plan view of the same compass on a smaller scale.

According to our invention we concentrate the radio active substances which have heretofore been spread over the entire compass card, in a small tube or container 9 which is secured near the reference index 5 so as to illuminate the same and the adjacent portions of the card 4, Fig. 3. The said radioactive substance is preferably placed within the tube in a dry or powdered form and consists preferably of a mixture of a radioactive salt and a finely divided fluorescent substance such as zinc sulphide. By using these substances in a dry or powder form a greater light emissivity is obtained than when applied in the form of a paste or paint on the compass markings, since certain rays probably, principally the "a" rays are largely absorbed thereby. The said container 9 is preferably secured or clamped to wire 6 by means of a strip 11 and member 10.

The container or tube 9 is preferably made of glass and sealed at both ends so that the radium is protected from the action of moisture or foreign substances.

Figure 4:
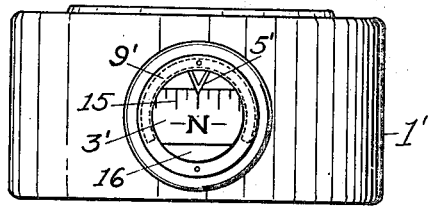
Fig. 4 is a front elevation of a marching or Army compass, showing the application of our invention thereto.
Figure 5:
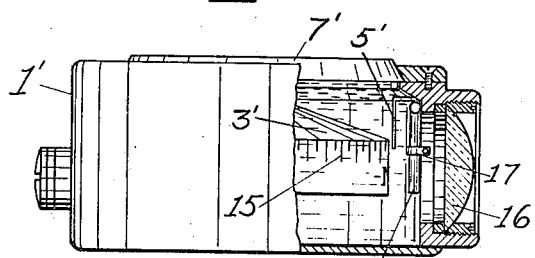
Fig. 5 is a side elevation partly in section of the compass shown in Fig. 4.

In Figs. 4 and 5 we have shown the invention applied to a marching compass. In these Figs. the casing of the compass is shown at 1'; the compass card at 3'; the luminous material container at 9' and the glass top of the compass at 7'. The rose 3' is shown as having the compass markings 15 on its side, for reading in connection with index 5′, through a small window 16 in the side of the casing.

The container 9′ may be fastened by means of small bands 17, to the casing directly inside of the window 16, and partly encircling the window as shown in Fig. 4. The illuminating material within the tube is designed to illuminate that portion of the compass rose which is visible through the window 16.

In accordance with the provisions of the patent statutes, we have herein described the principle of operation of our invention, together with the apparatus, which we now consider to represent the best embodiment thereof, but we desire to have it understood that the apparatus as shown is only illustrative and that the invention can be carried out by other means. Also, while it is designed to use the various features and elements in the combination and relations described, some of these may be altered and others omitted without interfering with the more general results outlined, and the invention extends to such use. It is obvious that the position of the radium may be varied within the scope of our invention. Also the application of our invention to other types of indicators will be obvious from the foregoing description.

Having described our invention what we claim and desire to secure by Letters Patent is:

1. In a compass, the combination with a casing, of a compass rose pivotally supported therein, a reference index therefor, a window in the side of said casing, a container adjacent said window, and a radio-active substance within said container for illuminating said index and the adjacent portions of said rose.

2. In a visual indicator, the combination with a casing, of an indicating element mounted therein, a reference index therefor, a window in the side of said casing, a container adjacent said window, and a radio-active substance within said container for illuminating said index and the adjacent portions of said element.

In testimony whereof we have affixed our signatures.

EDWIN W. DAY.
ROBERT S. A. DOUGHERTY.